(12) United States Patent
Kanno et al.

(10) Patent No.: US 6,493,115 B1
(45) Date of Patent: *Dec. 10, 2002

(54) IMAGE PROCESSING APPARATUS FOR PROCESSING A DOCUMENT IMAGE IN ACCORDANCE WITH AN AREA SPECIFIED BY A MARKER MARKED ON THE DOCUMENT

(75) Inventors: Akiko Kanno; Yoichi Takaragi, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/558,468

(22) Filed: Nov. 16, 1995

(30) Foreign Application Priority Data

Nov. 18, 1994 (JP) .............................. 6-309863

(51) Int. Cl.⁷ .......................... H04N 1/46; H04N 1/387; G06F 15/00
(52) U.S. Cl. .......................... 358/538; 358/453; 358/1.9
(58) Field of Search ................................ 358/504, 452, 358/453, 447, 471, 537, 538, 1.9, 468, 448; 382/164–165, 287; 707/523

(56) References Cited

U.S. PATENT DOCUMENTS

| | | | | |
|---|---|---|---|---|
| 3,921,026 A | * | 11/1975 | Konishi et al. ............. | 313/501 |
| 3,965,289 A | * | 6/1976 | Pugsley ....................... | 358/452 |
| 4,604,065 A | * | 8/1986 | Frazer et al. ................ | 434/331 |
| 5,013,925 A | * | 5/1991 | Elshoud .................... | 250/505.1 |
| 5,162,918 A | * | 11/1992 | Muramatsu .................. | 358/451 |
| 5,194,729 A | * | 3/1993 | Okisu et al. ............. | 250/222.1 |
| 5,266,805 A | * | 11/1993 | Edgar .......................... | 250/330 |
| 5,363,212 A | * | 11/1994 | Taniuchi et al. ............ | 358/453 |
| 5,481,334 A | * | 1/1996 | Arimoto et al. ............ | 355/201 |
| 5,548,663 A | * | 8/1996 | Sekine et al. ................ | 382/164 |

FOREIGN PATENT DOCUMENTS

JP 5-15095 * 5/1993

* cited by examiner

*Primary Examiner*—Madeleine Nguyen
(74) *Attorney, Agent, or Firm*—Fitzpatrick, Cella, Harper & Scinto

(57) ABSTRACT

An image processing apparatus is allows to specify a marker area in a simple and accurate manner even for a full color document sheet to conduct a predetermined edit process. The image apparatus comprises a read unit (three of four-line CCD) for color-decomposing predetermined colors of a document sheet image, an infrared ray read unit (the remaining one of the four-line CCD) for reading an infrared ray in a reflected light from an area of the document sheet image having marked with an infrared ray absorbing ink, a recognition unit for recognizing an area free from the infrared ray component read by the infrared ray read unit, and an image editting unit for conducting a predetermined edit process to the area recognized by the recognition unit in the document sheet image read by the read unit.

17 Claims, 14 Drawing Sheets

IMAGE PROCESSING APPARATUS FOR PROCESSING A DOCUMENT IMAGE IN ACCORDANCE WITH AN AREA SPECIFIED BY A MARKER MARKED ON THE DOCUMENT

BACKGROUND OF THE INVENTION

1. Field of the Invention

The present invention relates to an image processing apparatus for processing a document sheet image in accordance with an area specified by a marker marked on the document sheet.

2. Related Background Art

In an existing full color copying apparatus, an area specification by a colored marker has been widely used as a method for user designating an area in a document sheet which is subjected of a specific edit operation.

In this type of apparatus, three color amount signals R (red), G (green) and B (blue) which were read from the document sheet and converted to digital signals are compared with upper limits and lower limits of the R, G and B components of the respective reference markers to determine whether they are within the range of the marker colors or not, and if all of the three colors are determined to be within the range of the marker colors, it is recognized as the marker color and a mark signal is outputted. Based on the mark signal, a specific edit operation is conducted for an edit area (designated area) surrounded by the mark signal as shown in FIG. 16A, or defined by a closed area surrounding the mark signal as shown in FIG. 16B.

In the prior art, however, since the marker is discriminated from other area of the document sheet by the color, when the area is to be specified for a full color document sheet, the area may not be correctly specified if a color similar to the marker is present in the document sheet image.

Further, when the maker overlaps a color of the document sheet image, the area specification cannot be correctly conducted and the color of the document sheet image is also altered. As a result, the application of the area specification by the marker has been limited to a black and white document sheet in the prior art.

SUMMARY OF THE INVENTION

It is an object of the present invention to provide an image processing apparatus which solves the above problems.

It is another object of the present invention to provide an image processing apparatus which allows the area specification by a marker for a color document sheet.

It is other object of the present invention to provide an image processing apparatus which allows the area specification by the marker without contaminating a document sheet.

Other object and features of the present invention will be apparent from the following description and the accompanying drawings.

DETAILED DESCRIPTION OF THE PREFERRED EMBODIMENTS

The preferred embodiments of the present invention are now explained in detail with reference to the accompanying drawings.

[First Embodiment]

Figure 1:
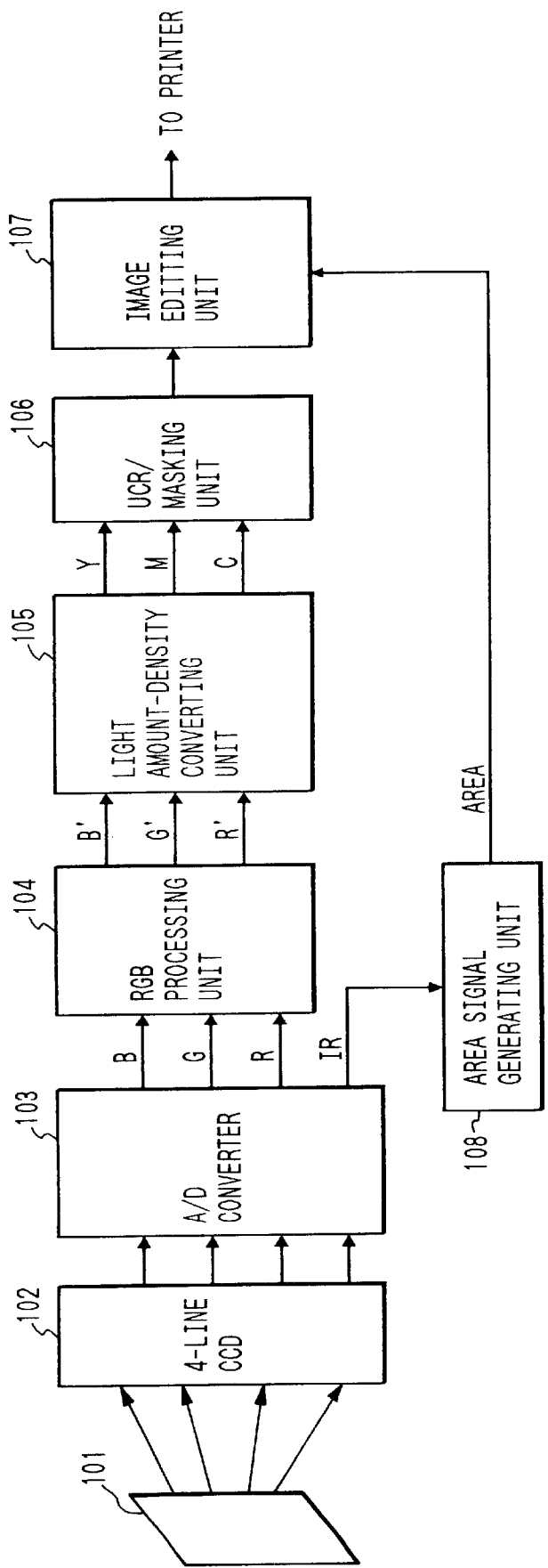
FIG. 1 shows a block diagram of a configuration of a digital full color copying apparatus to which a first embodiment of an image processing apparatus of the present invention is applied.

FIG. 1 shows a block diagram of a configuration of a digital full color copying apparatus to which a first embodiment of the image processing apparatus of the present invention is applied.

Referring to FIG. 1, numeral 101 denotes a document sheet, numeral 102 denotes a four-color CCD associated with blue (B), green (G), red (R) and infrared (IR) lights, numeral 103 denotes an A/D converter, numeral 104 denotes an RGB processing unit for adjusting R, G and B three-color signals, numeral 105 denotes a light amount-density converting unit, numeral 106 denotes a UCR/masking unit, numeral 107 denotes an image editting unit and numeral 108 denotes an area signal generating unit.

Figure 2:
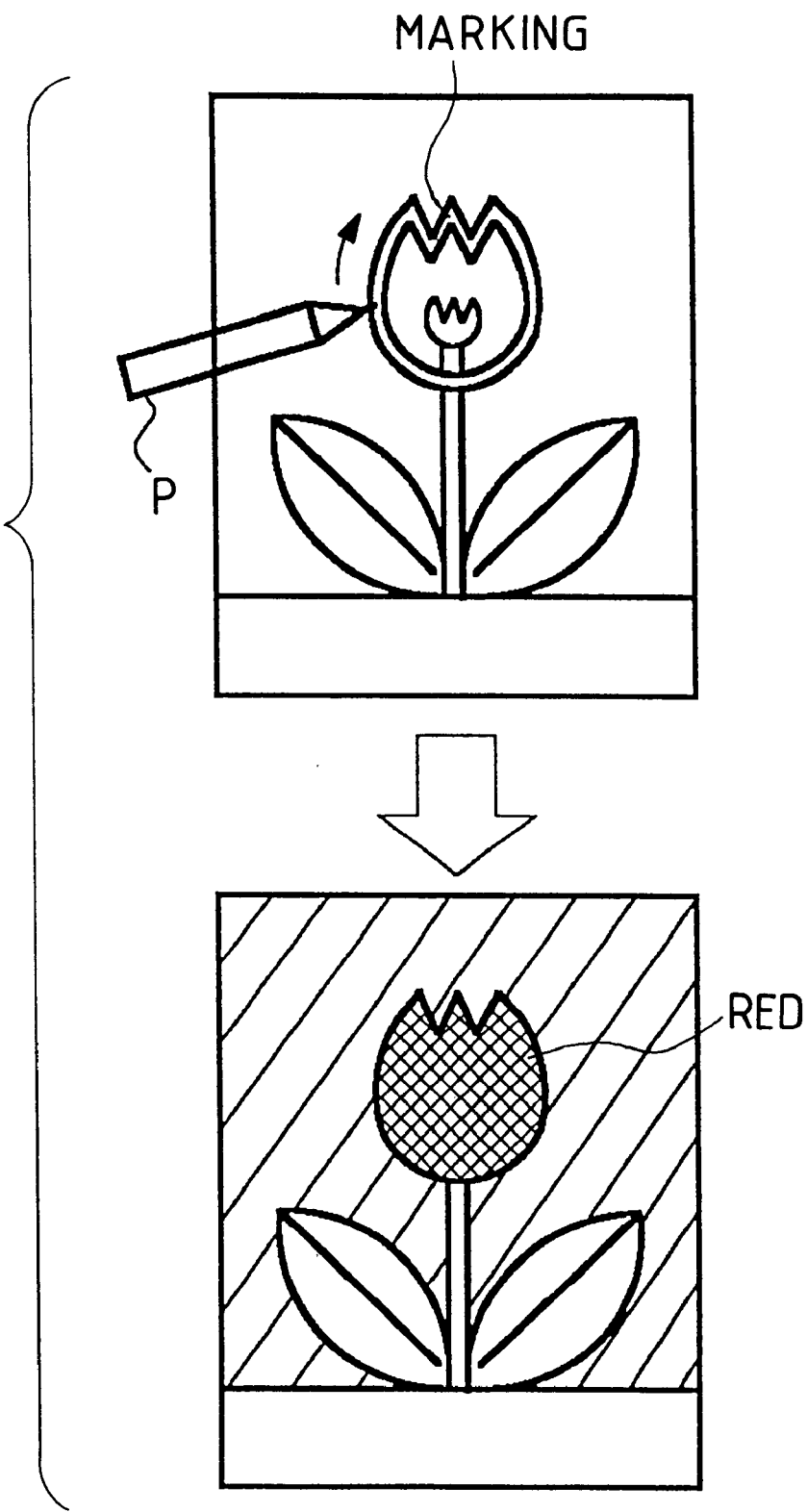
FIG. 2 shows an example of marking and an example of edition.

Referring to FIG. 2, it is assumed that a mark is marked at a desired area on the document sheet by a pen (IR pen) of an infrared ray absorbing ink (non-colored and transparent), and the inside of the marked area is painted by red as an edit operation.

When a start button, not shown, is depressed, the scan of the document sheet 101 by the four-line CCD 102 is started, and a reflected light from the document sheet is color-decomposed and read and converted to digital light amount signals R, G, B and IR by the A/D converter 103. The infrared component light amount signal IR is applied to the area signal generating unit 108 so that the marking area which is free from the IR component in the reflected light is detected, and a mark area signal AREA recognized based thereon is outputted from the area signal generating unit 108.

On the other hand, the remaining three primary color light amount signals R, G and B are applied to the RGB processing unit 104 and normalized to forms which are not dependent on the spectrum characteristic of the four-line CCD 102, and a color space is compressed so that the color space of the entire image falls within a reproducible range in the printer and they are outputted as corrected three primary color light amount signals R', G' and B'.

The corrected three primary color light amount signals R', G' and B' are converted to the corresponding color density signals Y (yellow), M (magenta) and C (cyan) by the light amount-density converting unit 105 and they are applied to the UCR/masking unit 106. The UCR/masking unit 106 generates a black signal Bk (black) from the C, M and Y three color signals and calculates respective color density signals C', M' and Y' in accordance with an actual toner spectrum characteristic and outputs the density signals C', M', Y' and Bk to the image editing unit 107 as record signals by sequential field. The light amount-density converting unit 105 has conversion tables for each of the three primary colors for converting the light amount signals R, G and B of the three primary colors to the density signals Y (yellow), M (magenta) and C (cyan).

The image editting unit 107 sequentially selects the record signal X (one of C', M', Y' and Bk) and the respective values of C, M, Y and Bk components constituting a preset "red" in accordance with the mark area signal AREA and output them to the printer (not shown).

Thus, as the document sheet is marked by the IR pen P, the infrared light amount signal IR is extracted from the document sheet image and the mark area signal is generated, and the predetermined edit operation is conducted for the area specified by the mark area signal. Accordingly, the problem encountered in the prior art in which when the color marking is made and the similar color to the marked color is present in the document sheet image, the marked color and the color in the document sheet image overlap and the area cannot be correctly specified is eliminated so that the marker area specification can be readily and accurately conducted for the full color document sheet to perform the predetermined edit operation. Further, since the marking is made by non-colored transparent IR absorbing ink pen, the area can be specified without contaminating the document sheet.

[Signal Generating Unit]

Figure 3:
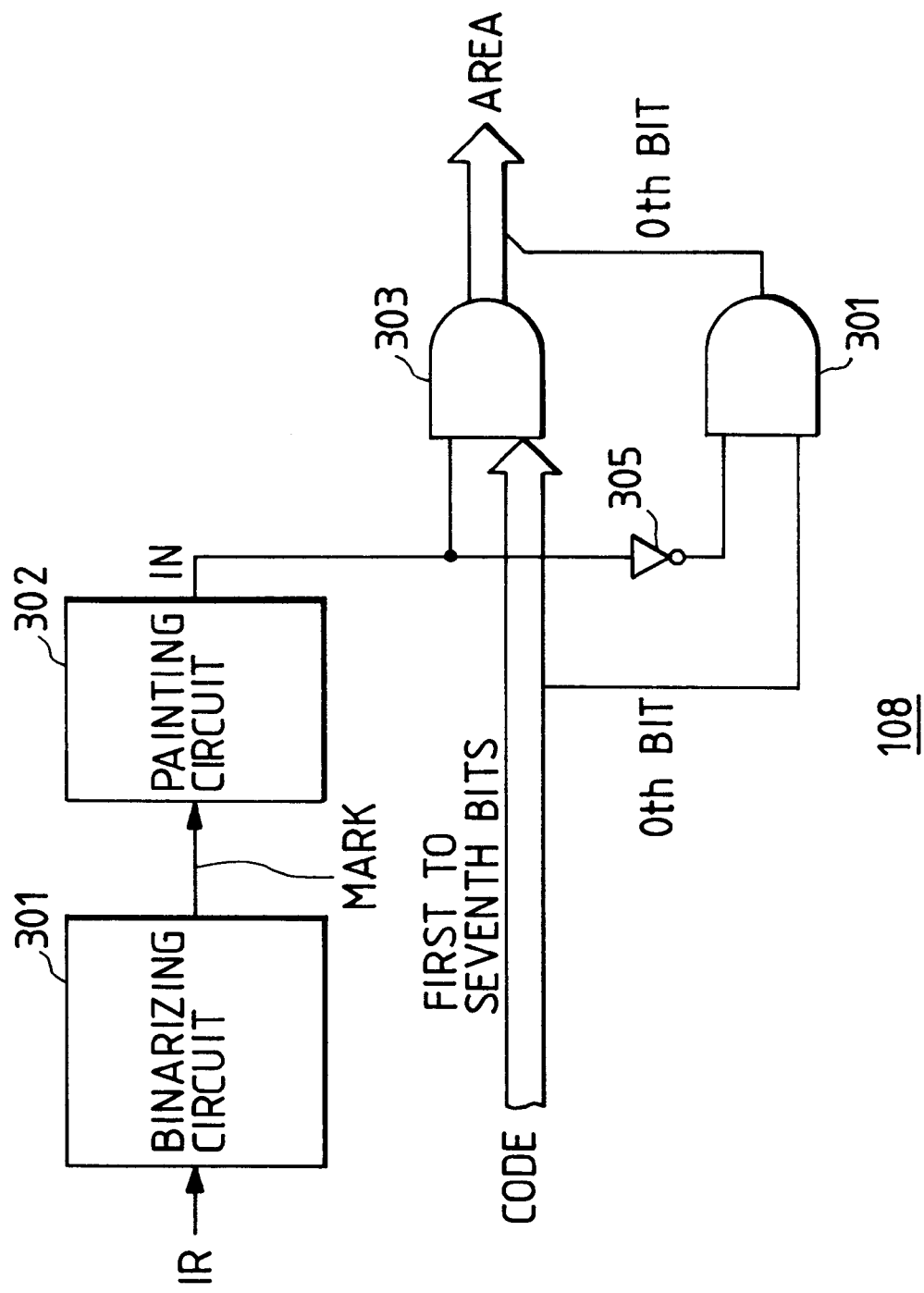
FIG. 3 shows a block diagram of a configuration of a signal generating unit.

FIG. 3 shows a block diagram of a configuration of the area signal generating unit 108. Numeral 301 denotes a binarizing circuit, numeral 302 denotes a painting circuit, numerals 303 and 304 denote AND gates and numeral 305 denotes an inverter.

The infrared light amount signal IR generated by the A/D converter 103 is converted by the binarizing circuit 301 to a binary mark signal MARK representing whether it corresponds to the marking area or not. The mark signal MARK is "1", it corresponds to the marking area, and when the mark signal MARK is "0", it does not correspond to the marking area. In the painting circuit 302, an inside area signal IN is generated which renders the area encircled by the image of the mark signals MARK=1 to "1" and the outside area to "0".

Figure 4:
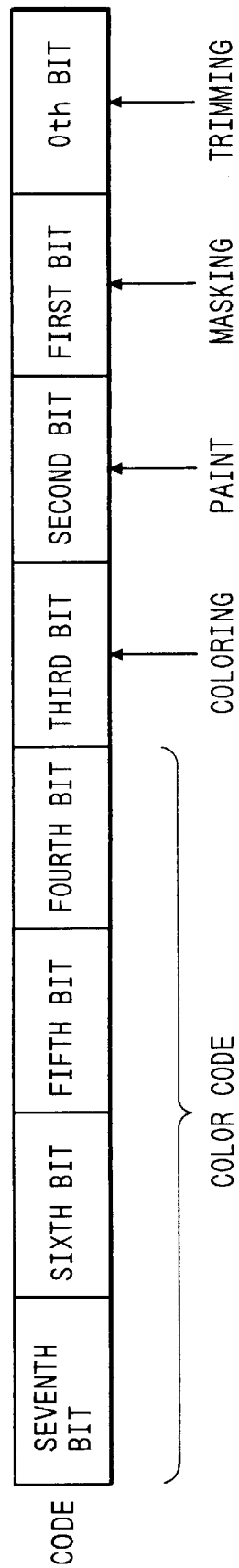
FIG. 4 shows a format of an operation code signal.

On the other hand, an operation code signal CODE indicating the content of operation to be performed for the specified area is applied to the AND gate 303 from a CPU (not shown). An example of the operation code CODE is shown in FIG. 4. The operation code CODE comprises eight bits and a bit 0 indicates trimming, a bit 1 indicates masking, a bit 2 indicates painting, a bit 3 indicates coloring, and bits 4 to 7 indicate color codes. In this format, assuming that a red color code is "0000", when the painting by red is to be made, the operation code CODE "00000100"=04H is inputted.

The operation code CODE is gated with the inside area signal IN by the AND gates 303 and 304 and the inverter 305 and outputted as an area signal AREA. As shown in FIG. 3, the inside area signal IN and the bits 7 to 1 of the operation code signal CODE are applied to the AND gate 303, and the inside area signal IN inverted by the inverter 305 and the bit 0 of the operation code signal CODE are applied to the AND gate 304.

Accordingly, when the inside area signal IN is "0" indicating the outside of the marked closed area, all bits of the operation code are converted to "0" (default), and if it is "1" indicating the inside of the closed area, only the trimming bit 0 of the specified operation code is converted to "0" and the remaining bits 1 to 7 are not converted, and they are outputted as the 8-bit area signal AREA.

In the present embodiment, the inside area signal IN is generated on real time (in synchronism with the image). Alternatively, the infrared light amount signal IR may be read in pre-scan, binarized and stored in a memory, and the painting process may be conducted by the image processor to generate a frame of inside area signal IN in advance.

In the present embodiment, the closed loop is drawn by the marker to specify the inside area thereof although the present invention is not limited thereto. For example, a point in a closed loop in the image may be marked and the entire inside of the closed loop encircling the marked point may be specified as the area, or the specified area may be painted by the marker.

[Image Editting Unit]

Figure 5:
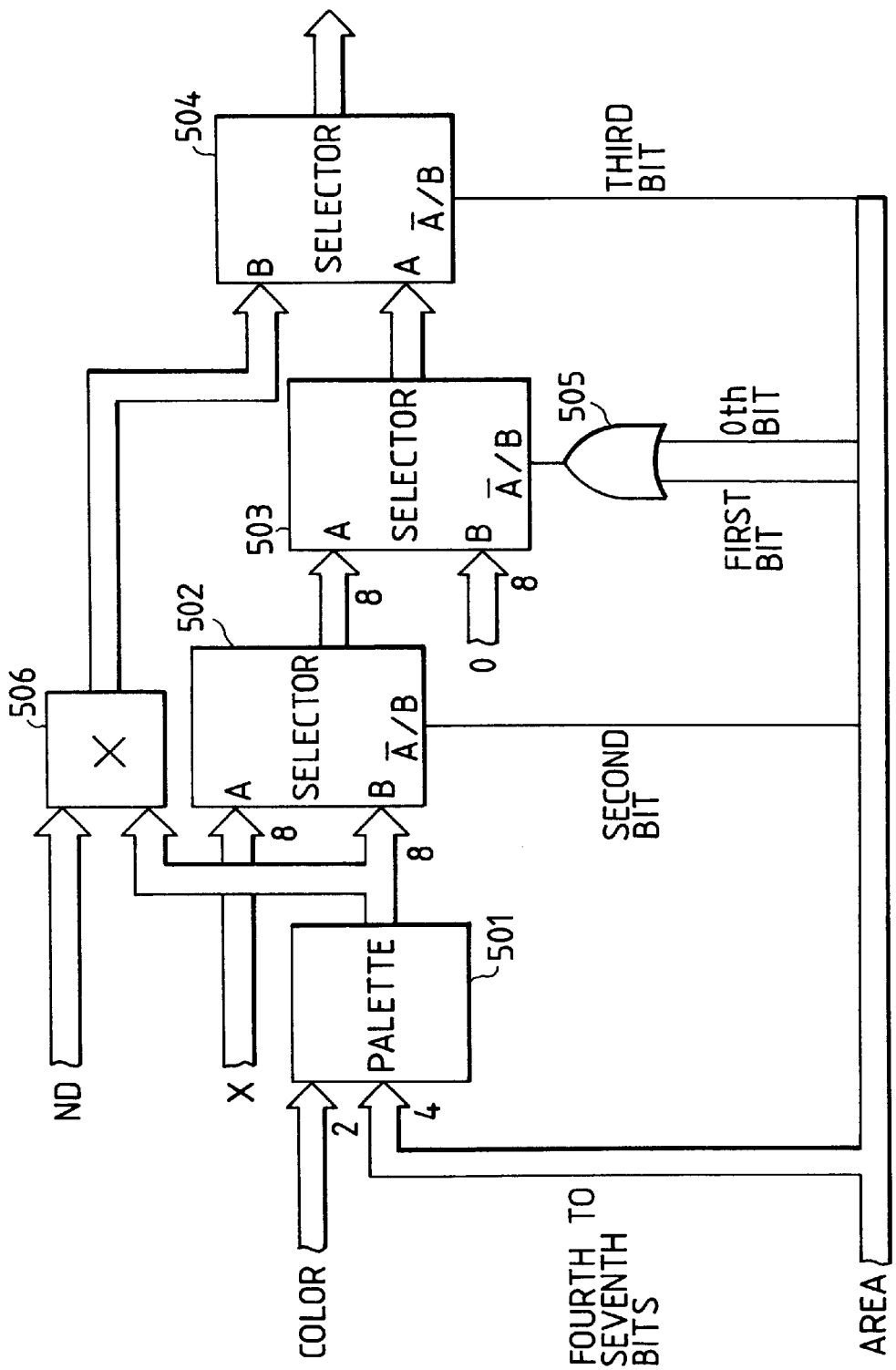
FIG. 5 shows a block diagram of a configuration of an image editting unit.

FIG. 5 shows a block diagram of the image editting unit 107. Numeral 501 denotes a palette in which specified colors are registered, numerals 502 to 504 denote selectors, numeral 505 denotes an OR gate and numeral 506 denotes a multiplier.

C, M, Y and Bk data representing "red" is stored at an address "0" of the palette 501 and C, M, Y and Bk data representing other colors are registered at other addresses. The color code bits 7 to 4 of the area signal AREA and a field sequential signal COLOR corresponding to C, M, Y and Bk are applied to the palette 501. A neutral density signal ND having only the density information generated by the UCR/masking unit 106 and having no color information and the output signal of the palette 501 are applied to the multiplier 506. The field sequential color density signals C', M' and Y' outputted from the UCR/masking unit 106 are applied to an input A of the selector 502, and the output signal of, the palette 501 is applied to an input B. The output signal of the selector 502 is applied to an input A of the selector 503, and an all zero 8-bit signal for forming a pure white image is applied to an input B. The output of the selector 503 and the output of the multiplier 506 are applied to inputs A and B of the selector 504, respectively.

The painting bit 2 signal of the area signal AREA is applied to a selection input A/B of the selector 502, and an ORed signal of the trimming bit 0 of the area signal AREA and the marking bit 0 through the OR gate 505 is applied to a selection input A/B of the selector 503, and the coloring bit 3 signal of the area signal AREA is applied to a selection input A/B of the selector 504. The selectors 502, 503 and 504 select the input A when "0" is applied to the selection input A/B, and select the input B when "1" is applied.

An operation of the image editing unit 107 is now explained for the painting by red, that is, the operation code CODE "04H" is inputted from the CPU.

In this case, the palette 501 outputs cyan data for "red" when a cyan image is to be formed and magenta data for "red" when a magenta image is to be formed in accordance with the field sequential signal COLOR. As described above, when the operation code=04H, the inside area signal IN=1, and when "04H" is applied as the area signal AREA, "1", "0" and "0" are applied to the selection inputs A/B of the selectors 502, 503 and 504, respectively, so that the selectors 502, 503 and 504 select the inputs B, A and A, respectively. Accordingly, in this case, the cyan data for "red" and the magenta data for "red", etc. are outputted from the palette 501 through the selectors 502, 503 and 504 as the record signal.

On the other hand, when the operation code=04H, the inside area signal IN=0, and when "00H" is applied as the area signal AREA, "0" is applied to the selection input A/B of each of the selectors 502, 503 and 504 so that the color density signals C', M' and Y' (image signal X) are outputted through the selectors 502, 503 and 504 as the record signal.

[Infrared Signal Detection]

Figure 6:
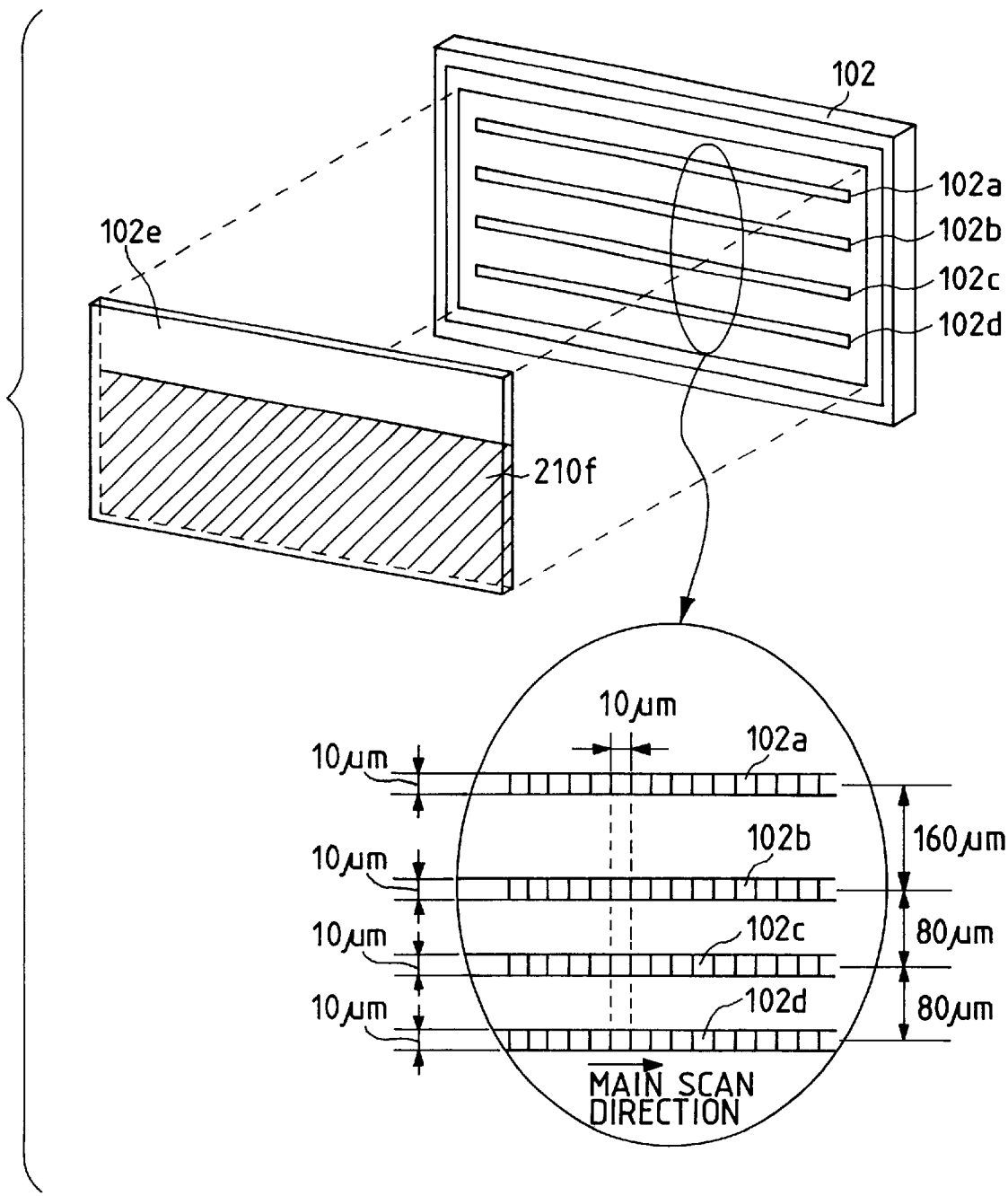
FIG. 6 shows a perspective view of a four-line CCD.
Figure 7:
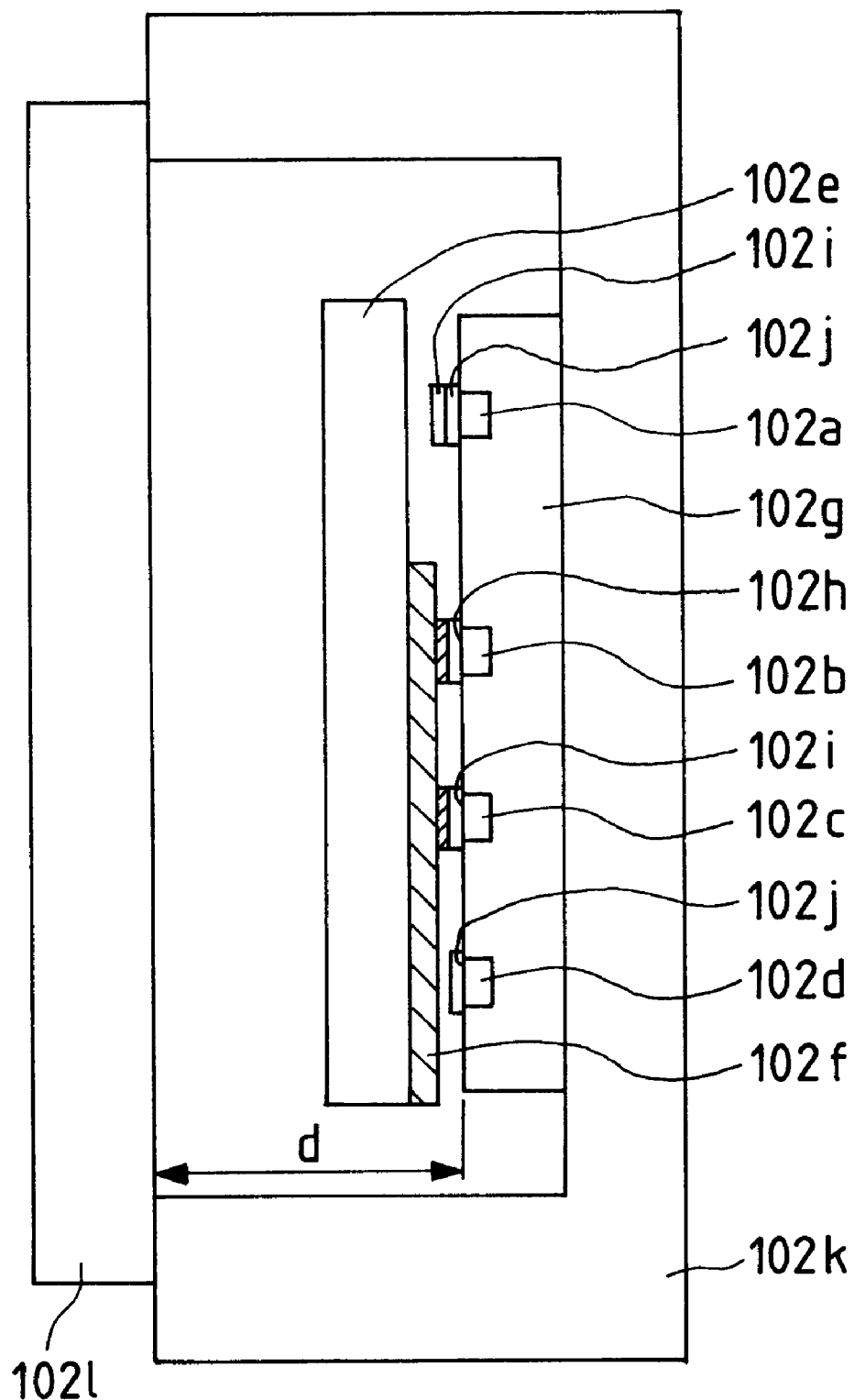
FIG. 7 shows a side view of the four-line CCD.

FIG. 6 shows a perspective view of the four-line CCD 102 and FIG. 7 shows a side view thereof. Numeral 102a denotes an IR sensor for reading an infrared ray (IR) and numerals 102b, 102c and 102d denote R sensor, G sensor and B sensor for reading R, G and B wavelength components, respectively. These sensors comprise lines of light-receiving elements and have apertures of 10 μm in a main scan direction and a sub-scan direction with pixel size being 10 μm×10 μm. The sensors (light receiving element lines) are monolithically formed on one silicon chip g (see FIG. 7) so that they are arranged in parallel to each other to read the same line of the document sheet.

By arranging the IR sensor 102a, the R sensor 102b, the G sensor 102c and the B sensor 102d monolithically on the same silicon chip, an optical system such as a lens may be shared by the reading of the visible ray and the reading of the infrared ray, the accuracy of optical adjustment is improved and the adjustment thereof is facilitated.

Figure 8:
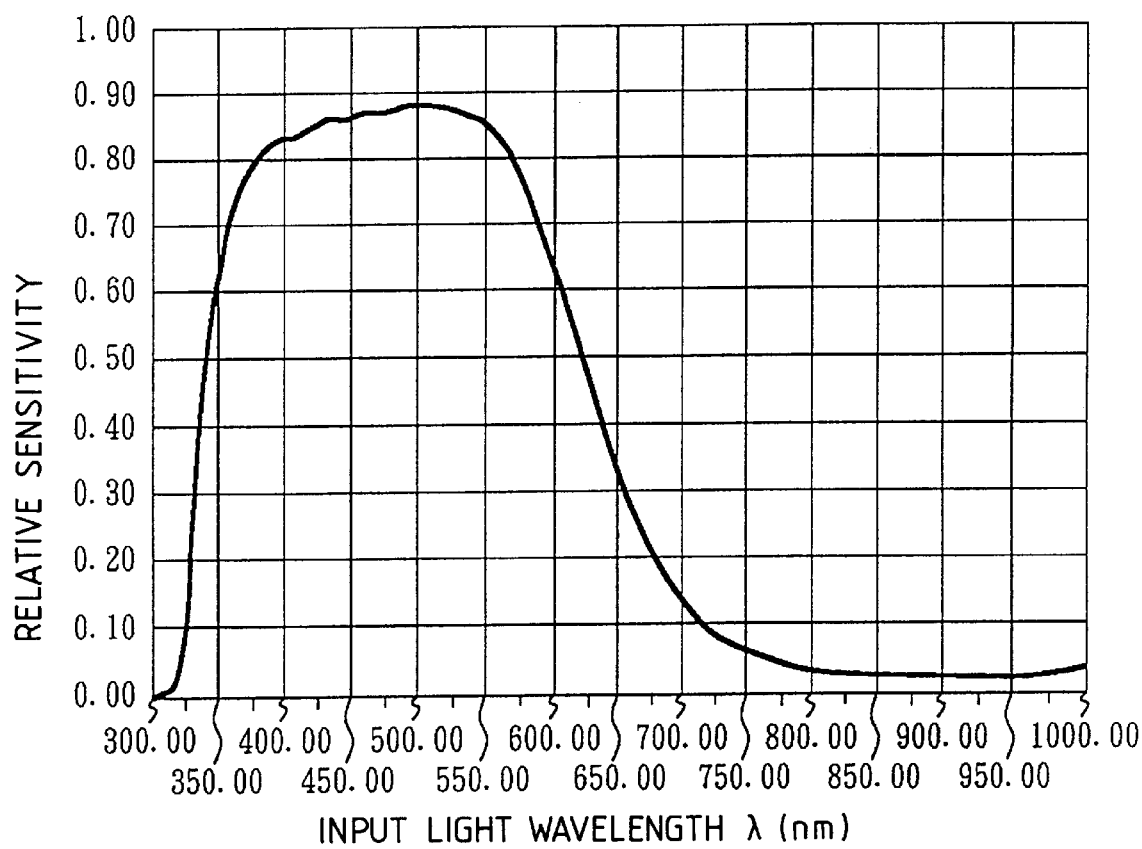
FIG. 8 shows a characteristic chart of an infrared ray cut characteristic of a dichroic mirror.
Figure 9:
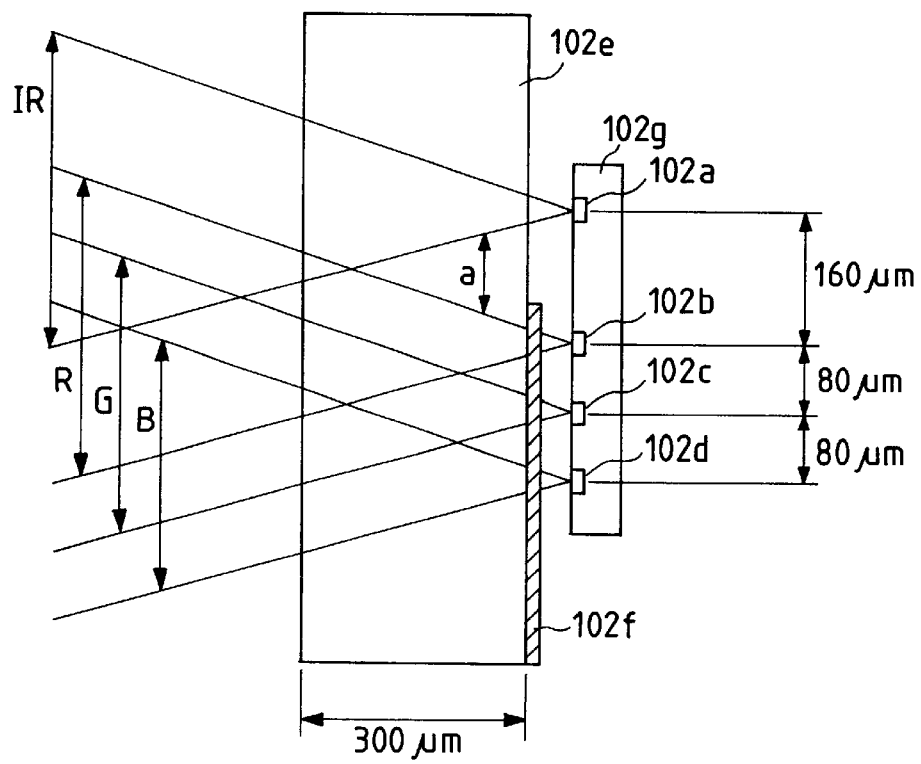
FIG. 9 illustrates the significance of the arrangement of the dichroic mirror closely to optical sensors.

Numeral 102e denotes a glass plate of approximately 300 μm thick and a dichroic mirror 102f formed by a vapor deposition film is provided in a hatched area (sensor area) to impart an infrared ray cut characteristic. As shown in FIG. 8, the infrared ray cut characteristic of the dichroic mirror 102f exhibits a relative sensitivity of 0.65 or higher in an incident light wavelength range of 350 nm–600 nm and the relative sensitivity is extremely low for other incident light wavelength.

As shown in FIG. 6, the IR sensor 102a, the R sensor 102b, the G sensor 102c and the B sensor 102d have length of 10 μm per pixel along the main scan direction, and each sensor has 5000 pixels along the main scan direction to read a shorter side of the size A3 document sheet (297 mm) at a resolution of 40 dpi. A line distance between each of the R sensor 102b, G sensor 102c and B sensor 102d is 80 μm and they are separated by eight lines for the sub-scan resolution of 400 lpi (lines per inch).

On the other hand, the line distance between the IR sensor 102a and the R sensor 102b is double of that of other sensors, that is, 160 μm (16 lines). By taking a longer sensor spacing between the IR sensor 102a and the R sensor 102b than that for others, the mounting accuracy in bonding the glass plate 102e to the chip surface may be low tin associating the vapor deposition plane 102f of the glass plate 102e to the sensors 102b–102d and the non-vapor deposition area to the sensor 102a.

As shown in FIG. 7, the IR sensor 102a, the R sensor 102b, the G sensor 102c and the B sensor 102d are monolithically formed on the same silicon chip 102g and optical filters (dye filters) are mounted on the surfaces of the respective sensors to impart the predetermined IR, R, G and B spectrum characteristic, respectively.

Namely, an R filter 102h, a G filter 102i and a B filter 102j are mounted on the surfaces of the R sensor 102b, the G sensor 102c and the B sensor 102d, respectively, to impart the R, G and B spectrum characteristics, and by virtue of those filters, the R sensor 102b, the G sensor 102c and the B sensor 102d output the R, G and B color component read signals, respectively. The R filter 102h and the B filter 102j are stacked on the surface of the IR sensor 102a, and by virtue of those filters, the IR sensor 102a can output the IR light having a wavelength of 750 nm or longer.

As shown in FIG. 7, the silicon chip g and the glass plate e are housed in a ceramic package 102k of U-shape section, and a cover glass 102l is attached to an opening of the ceramic package 102k.

As shown in FIG. 7, the glass plate 102e has the dichroic mirror 102f (vapor deposition plane) for cutting the infrared ray faced toward the sensor and mounted near the sensor surface. Where the dichroic mirror 102f is positioned apart from the sensor the light beams (particularly the IR and R light beams) focused by the lens (not shown) and directed to the respective sensors would overlap and it would not be possible to impart the infrared ray cut function of the dichroic mirror 102f only to the incident lights to the G sensor 102c and the B sensor 102d. When the IR and R light beams overlap, most of the IR light beam focused onto the IR sensor is blocked and the IR signal level would be decreased.

When the dichroic mirror 102f is mounted closely to the sensor surface, mounting allowance a between the R filter 102h for the IR sensor 102a and the B filter 102j and the R filter 102h for the R sensor 102b may be large and the mounting accuracy of the glass plate 102e to the silicon chip g may be low.

Figure 10:
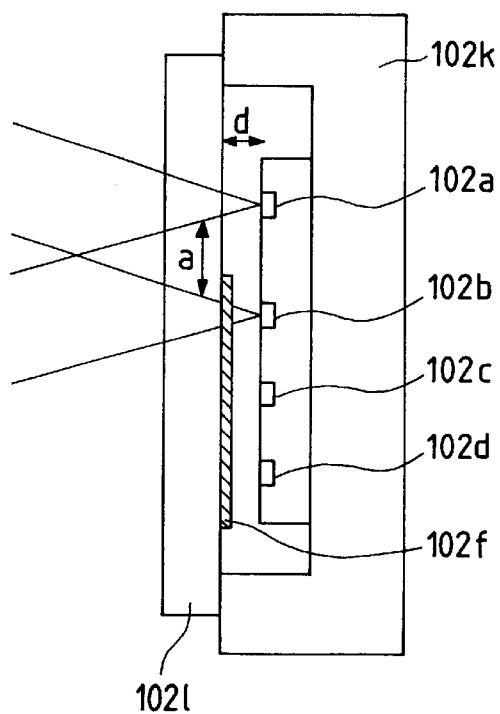
FIG. 10 shows a side view of a modification of the four-line CCD.

As shown in FIG. 10, the infrared ray cutting dichroic mirror 102f may be formed on the cover glass 102l facing the sensor without providing the glass plate 102e. In this case, the ceramic package 102k is formed such that a distance d between the sensor surface and the inner plane of the cover glass 102l is sufficiently short so that the IR light beam does not substantially pass through the dichroic mirror 102f.

Figure 11:
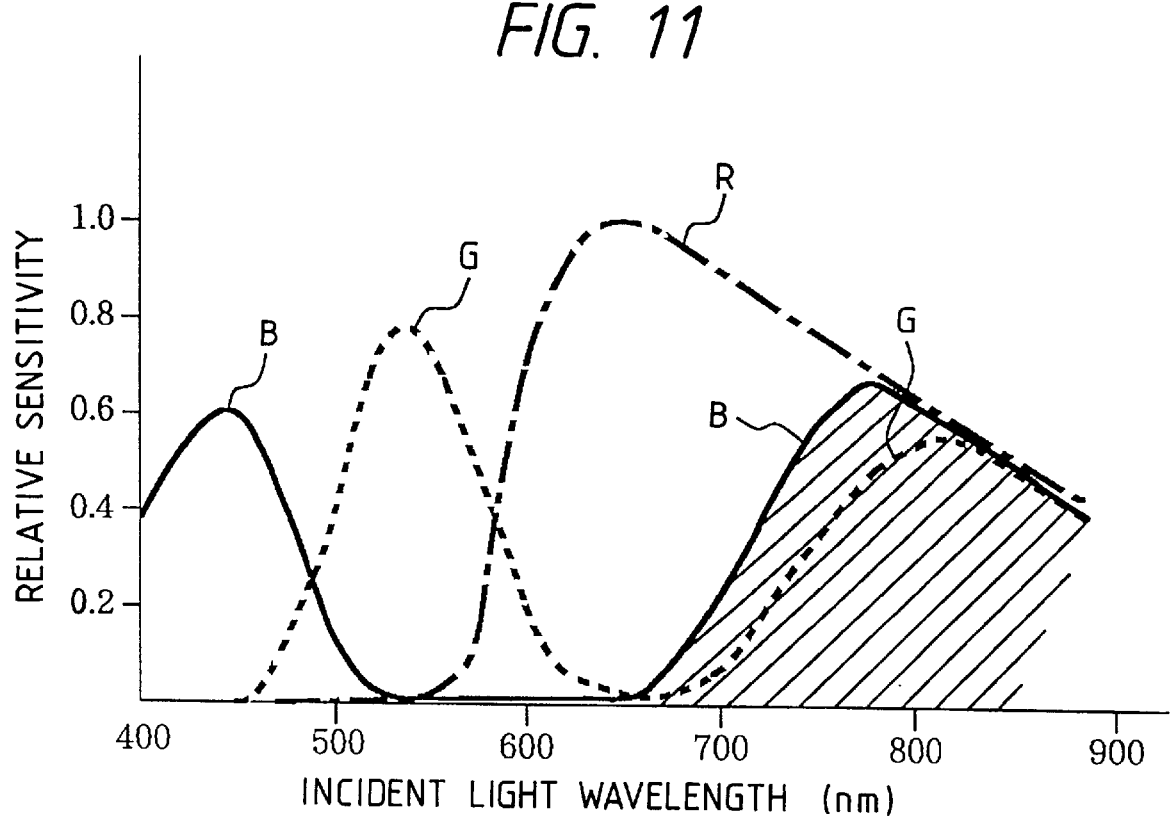
FIG. 11 shows a characteristic chart of a spectrum sensitivity characteristic of a filter for the optical sensor.

Referring to FIG. 11, the spectrum characteristics of the filters for the IR sensor 102a, the R sensor 102b, the G sensor 102c and the B sensor 102d are explained.

In FIG. 11, R denotes an output characteristic of the sensor by the R filter, and it has a sensitivity to lights in a red wavelength region and an infrared wavelength region. G denotes an output characteristic of the sensor by the G filter and it has a sensitivity to lights in a green wavelength region and an infrared wavelength region. B denotes an output characteristic of the sensor by the B filter 102j and it has a sensitivity to lights in a blue wavelength region and the infrared wavelength region.

Thus, the R sensor 102b, the G sensor 102c and the B sensor 102d have sensitivities to the infrared ray of 700 nm or longer, respectively, but as to the IR sensor 102a, the output characteristic of the IR sensor 102a has the sensitivity to only the infrared ray shown by hating in FIG. 11 because the R filter 102h and the B filter 102j are laminated.

Figure 12:
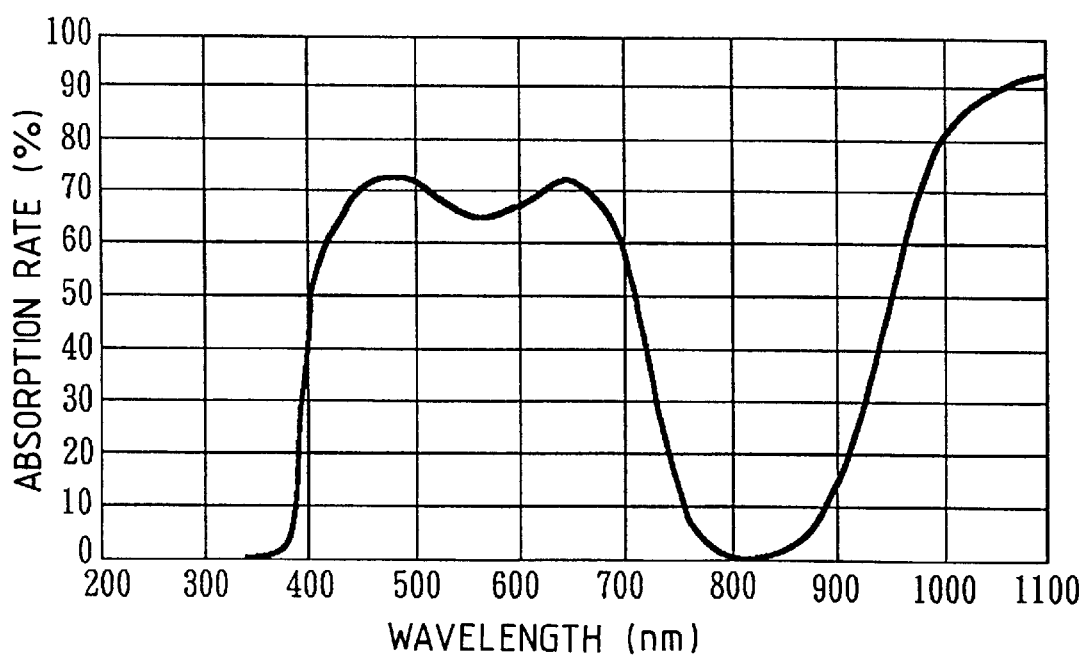
FIG. 12 shows a characteristic chart of a spectrum absorption characteristic of an infrared ray absorption ink used in the first embodiment.

In the present embodiment, the infrared ray absorbing material SIR-159 by Mitsui Tohatu Chemical is used for the infrared ray absorbing ink to mark the desired area of the document sheet. As shown in FIG. 12, this infrared ray absorbing material has a spectrum absorption characteristic to absorb not only the infrared ray wavelength region but also the red, green and blue wavelength lights.

Figure 13:
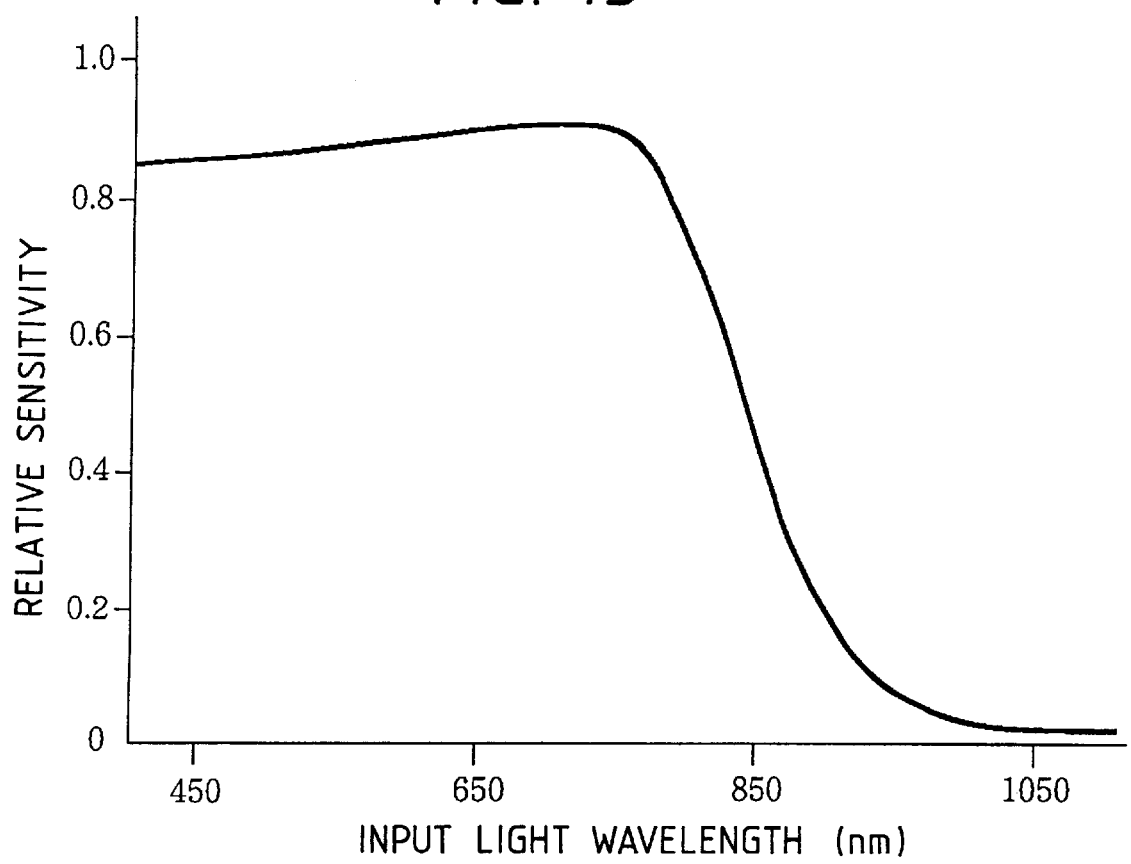
FIG. 13 shows a characteristic chart of a spectrum sensitivity characteristic of a far infrared ray cut filter arranged in the first embodiment.

In the present embodiment, an infrared ray cut filter by a dichroic mirror having a spectrum sensitivity characteristic as shown in FIG. 13 is provided on the lens, not shown, in order to detect only the infrared ray of 750 nm–850 nm by the IR sensor 102a to read the presence or absence of the mark by the infrared ray absorbing material SIR-159. By providing the far infrared ray cut filter on the lens, the infrared ray is cut in the incident lights to not only the IR sensor 102a but also the R sensor 102b, the G sensor 102c and the B sensor 102d, but such cutting is not harmful.

[Second Embodiment]

In the first embodiment, when the spectrum characteristic of the infrared ray absorbing ink is limited to the invisible region to prevent the influence to the document sheet image, the image by the marker is not changed in color or contaminated but it is difficult to check the specified area visually.

In the second embodiment, when the user enters a "marker area specification" key input, the marking area and the area specified by the marking are displayed on the display unit to allow visual confirmation.

Figure 14:
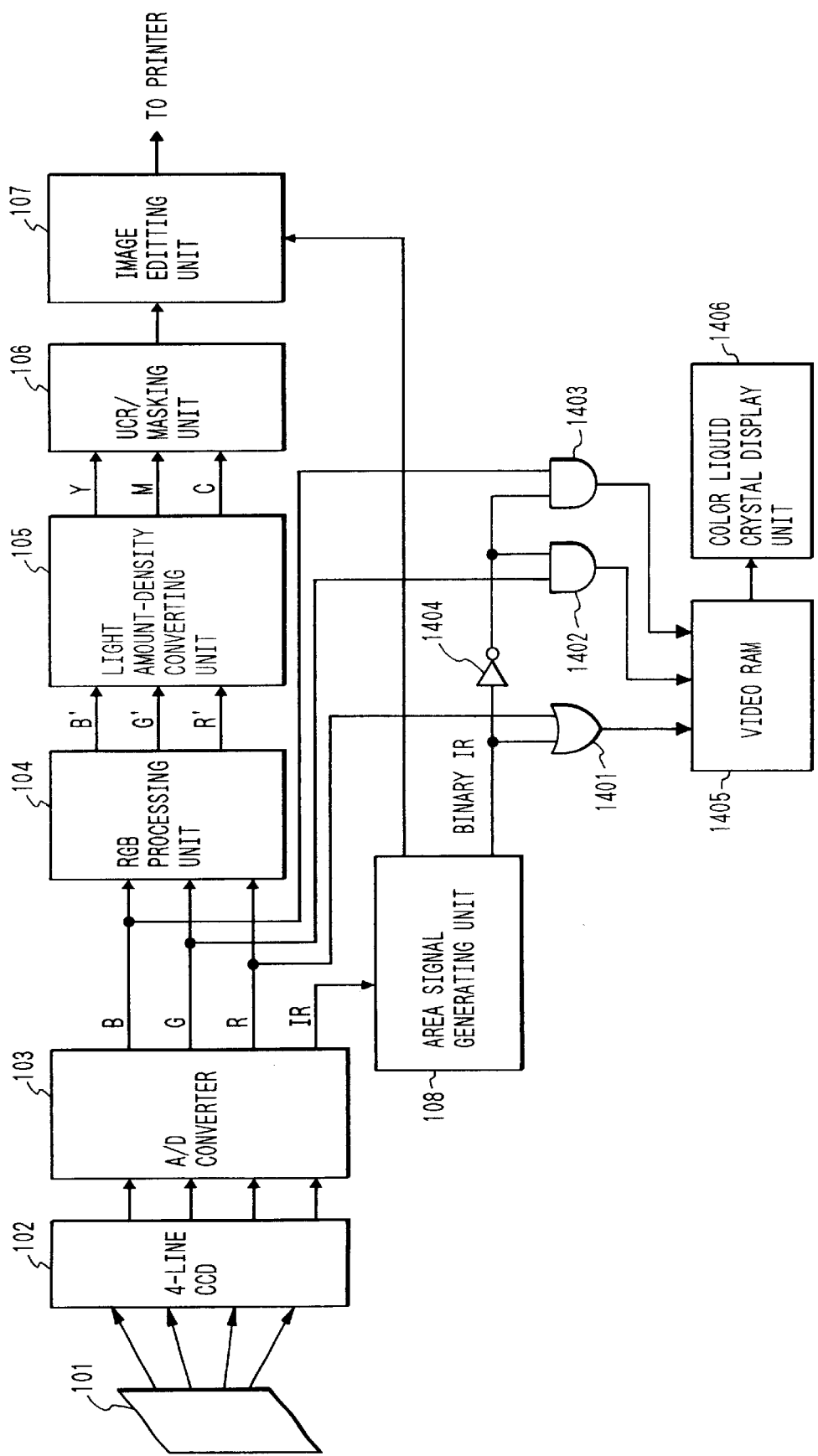
FIG. 14 shows a block diagram of a configuration of a color digital full color copying apparatus to which a second embodiment of the image processing apparatus of the present invention is applied.

FIG. 14 shows a block diagram of a digital full color copying apparatus to which the image processing apparatus of the second embodiment is applied.

Differences from the first embodiment shown in FIG. 1 are explained. In the second embodiment, an OR gate 1401, AND gates 1402 and 1403, an inverter 1404, a video RAM 1405 and a color liquid crystal display unit 1406 are provided.

An R signal from the A/D converter 103 and a binary IR signal from the area signal generating unit 108 are applied to the OR gate 1401, a G signal and a B signal from the A/D converter 103 are applied to the AND gates 1402 and 1403, and a binary signal from the area signal generating unit 108, inverted by the inverter 1404 is applied in common.

Under this arrangement, when the IR signal is read by the pre-scan, the IR signal binarized by the area signal generating unit 108 is gated with the three primary color signals by using it as the marking signal, and for the marked pixels, the substitution of (R, G, B)=(255, 0, 0) is made and it is written in the video RAM 1405. Thus, the document sheet image with the marked area in red is displayed on the color liquid crystal display unit 1406 so that the user can visually confirm the marked area.

[Third Embodiment]

In a third embodiment, when the IR absorbing ink is colored by a visible color to allow easy specification of the area by the user, the IR absorbing ink color is removed from the document sheet image in the process of image processing so that the output image is produced without change in color due to the marking.

Figure 15:
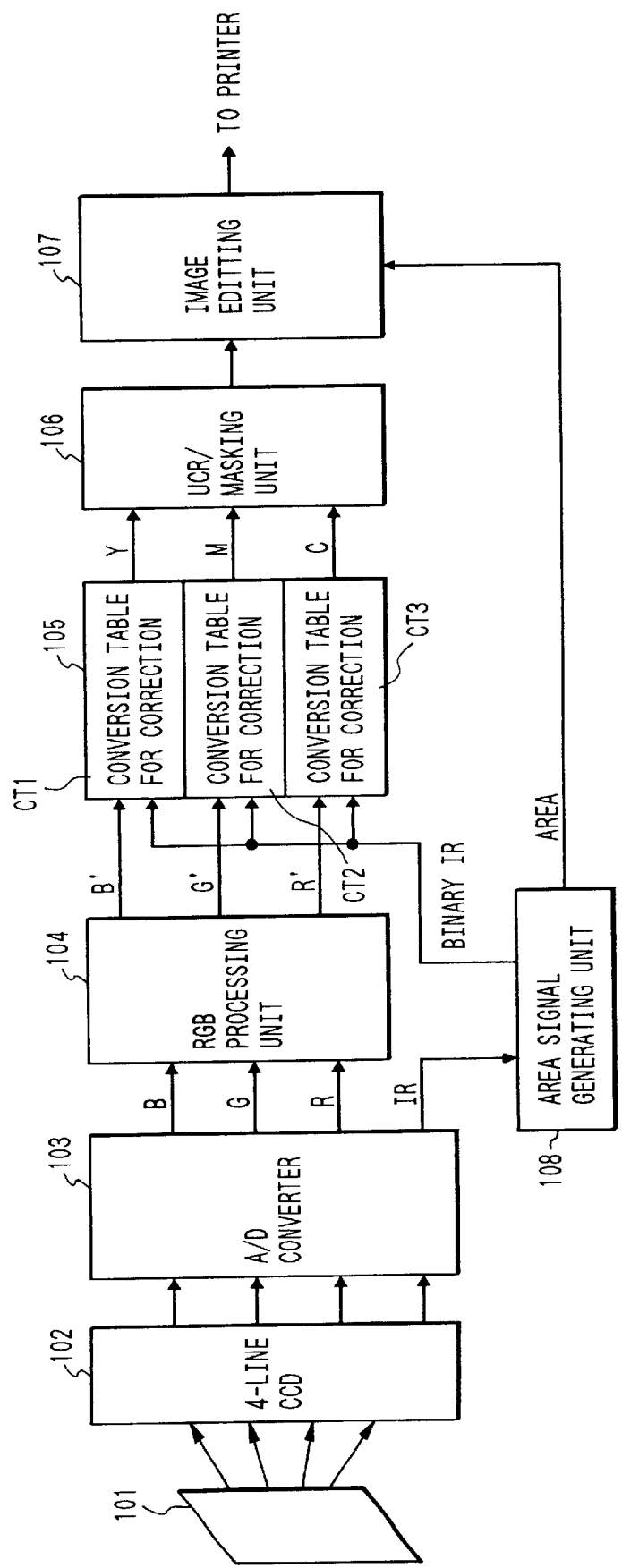
FIG. 15 shows a block diagram of a configuration of a digital full color copying apparatus to which a third embodiment of the image processing apparatus of the present invention is applied.
Figure 16A:
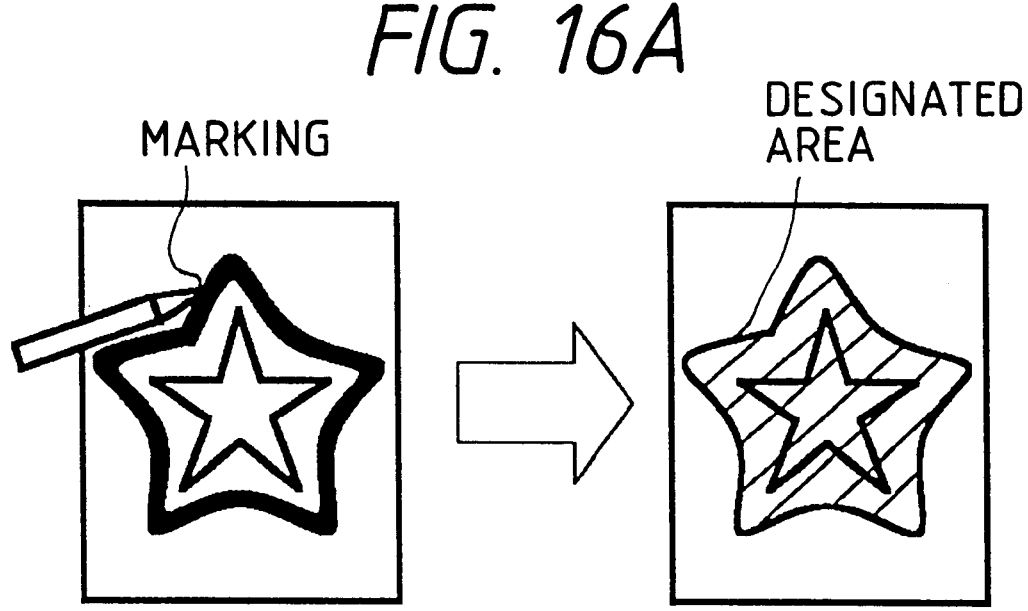
FIGS. 16A and 16B illustrate examples of the edit area specification (recognition) based on a marker.
Figure 16B:
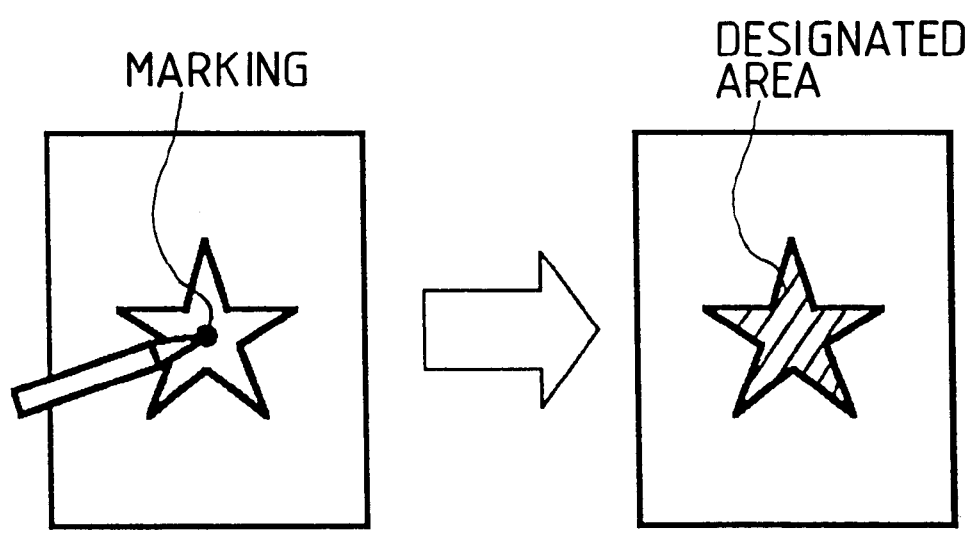

FIG. 15 shows a block diagram of a configuration of a digital full color copying apparatus to which the image processing apparatus of the third embodiment is applied. In the third embodiment, the light amount-density converting unit 105 has separate conversion tables, one for each of the three primary colors to convert the three primary color light amount signals R, G and B to the density signals Y (yellow), M (magenta) and C (cyan), respectively, as well as correcting conversion table CT1–CT3, one for each of the three primary colors, to convert them to the density signals Y (yellow), M (magenta) and C (cyan) while correcting the changes in color of the three primary colors when the IR absorbing ink is added.

In this case, the correcting conversion tables CT1–CT3 are generated by the area signal generating unit 108 and selected by the binarized IR signal (IR=1) which indicates the marking. Thus, as to the pixels in the marked area, the IR absorbing ink color is eliminated and the marker area can be specified without affect of the marker color remaining in the output image.

While the light amount/density table is used for the correction in the present embodiment, a dedicated circuit may be used or other conversion table such as a γ correction table for the printer may be used to eliminate the IR ink color.

The present invention is not limited to the above embodiments. For example, the IR sensor and the R, G and B sensors need not be formed on the same silicon chip but the IR sensor may be formed on other silicon chip from that of the R, G and B sensors. Further, the present invention is applicable to not only the digital full color copying apparatus but other image processing apparatus.

As described hereinabove, since the mark detection means for reading the mark marked in the document sheet image by the infrared ray absorbing ink (material) is provided, the marker area can be simply and accurately specified in the full color document sheet and the desired edit operation can be performed.

What is claimed is:

1. An image processing apparatus comprising:

reading means for reading an image of a document on which an invisible mark containing an infrared-ray absorbing material is imprinted, and outputting a visible image signal representing a visible image and an invisible image signal representing an invisible image;

mark detection means for detecting said invisible mark on the document on the basis of the invisible image signal output by said reading means;

recognition means for recognizing an area surrounded by the mark detected by said mark detection means and outputting area data;

synchronizing means for synchronizing the area data output by said recognition means with the visible image signal output by said reading means;

display means for performing displaying so that the area surrounded by the mark can be discriminated, based on the output of said synchronizing means; and process means for processing the visible image read by said reading means in accordance with the area recognized by said recognition means.

2. An image processing apparatus according to claim 1, wherein said mark detection means is an integral part of said reading means.

3. An image processing method comprising the steps of:

reading an image of a document on which an invisible mark containing an infrared-ray absorbing material is imprinted, and outputting a visible image signal representing a visible image and an invisible image signal representing an invisible image;

detecting the invisible mark on the document on the basis of the invisible image signal output in said reading step;

recognizing an area surrounded by the mark detected in said detecting step and outputting area data;

synchronizing the area data output in said recognizing step with the visible image signal output in said reading step;

performing displaying so that the area surrounded by the mark can be discriminated, based on the output of said synchronizing step; and processing the visible image read in said reading step in accordance with the recognized area of the image.

4. An image processing apparatus comprising:

reading means for reading an image of a document having thereon an invisible mark for designating an area, and outputting a visible image signal representing a visible image and an invisible image signal representing an invisible image;

detection means for detecting an area designated by said invisible mark on the document on the basis of the invisible image signal output by said reading means and outputting area data;

synchronizing means for synchronizing the area data output by said detection means with the visible image signal output by said reading means;

display means for performing displaying so that the area designated by said invisible mark can be discriminated, based on the output of said synchronizing means; and process means for processing the image read by said reading means in accordance with the area detected by said detection means.

5. An apparatus according to claim 4, wherein said invisible mark comprises an infrared-ray absorbing material.

6. An apparatus according to claim 5, wherein said reading means includes a Red, Green, and Blue sensor and an infrared-ray sensor.

7. An image processing apparatus comprising:

reading means for reading an image of a document having thereon an invisible mark, and outputting a visible image signal representing a visible image and an invisible image signal representing an invisible image;

detection means for detecting said invisible mark on the document on the basis of the invisible image signal output by said reading means and outputting invisible mark data;

synchronizing means for synchronizing the invisible mark data output by said detection means with the visible image signal output by said reading means;

display means for performing displaying so that a position of said invisible mark can be discriminated, based on the output of said synchronizing means; and process means for processing the visible image read by said reading means in accordance with the mark detected by said detection means.

8. An apparatus according to claim 7, wherein said invisible mark comprises an infrared-ray absorbing material.

9. An apparatus according to claim 8, wherein said reading means includes a Red, Green, and Blue sensor and an infrared-ray sensor.

10. An image processing method comprising the steps of:

reading an image of a document having thereon an invisible mark for designating an area, and outputting a visible image signal representing a visible image and an invisible image signal representing an invisible image;

detecting an area designated by said invisible mark on the document on the basis of said invisible image signal and outputting area data;

synchronizing the area data output in the detecting step with the visible image signal output in said reading step;

performing displaying so that the area designated by said invisible mark can be discriminated, based on the output of the synchronizing step; and processing the visible image read in said reading step in accordance with the area detected in said detecting step.

11. A method according to claim 10, wherein said invisible mark comprises an infrared-ray absorbing material.

12. A method according to claim 10, wherein a Red, Green, and Blue sensor and an infrared-ray sensor are used in said reading step.

13. An image processing method comprising the steps of:

reading an image of a document having thereon an invisible mark, and outputting a visible image signal representing a visible image and an invisible image signal representing an invisible image;

detecting said invisible mark on the document on the basis of said invisible image signal and outputting invisible mark data;

synchronizing the invisible mark data output in the detecting step with the visible image signal output in the reading step;

performing displaying so that a position of said invisible mark can be discriminated, based on the output of the synchronizing step; and processing the visible image read in said reading step in accordance with the mark detected in said detection step.

14. A method according to claim 13, wherein said invisible mark comprises an infrared-ray absorbing material.

15. A method according to claim 14, wherein a Red, Green, and Blue sensor and an infrared-ray sensor are used in said reading step.

16. An image processing apparatus comprising:

reading means for reading an image of a document having thereon an invisible mark, and outputting a visible image signal representing a visible image and an invisible image signal representing an invisible image;

detection means for detecting said invisible mark on the document on the basis of said invisible image signal and outputting area data;

synchronizing means for synchronizing the area data output by the detection means with the visible image output by the reading means; and display means for performing displaying so that the area represented by said invisible mark can be discriminated, based on the output of said synchronizing means.

17. An image processing method comprising the steps of:

reading an image of a document having thereon an invisible mark representing an area, and outputting a visible image signal representing a visible image and an invisible image signal representing an invisible image;

detecting said invisible mark on the document on the basis of said invisible image signal and outputting area data;

synchronizing the area data output in the detecting step with the visible image output in the reading step; and performing displaying so that the area represented by said invisible mark can be discriminated, based on the output of said synchronizing step.

* * * * *

UNITED STATES PATENT AND TRADEMARK OFFICE
CERTIFICATE OF CORRECTION

PATENT NO. : 6,493,115 B1
DATED : December 10, 2002
INVENTOR(S) : Kanno et al.

It is certified that error appears in the above-identified patent and that said Letters Patent is hereby corrected as shown below:

Title page,
Item [56], References Cited, U.S. PATENT DOCUMENTS, insert
-- 6,051,826    4/2000    Arimoto et al.    250/208.1 --; and
Item [57], ABSTRACT, "is" should be deleted.

Column 1,
Line 34, "other" should read -- the other --;
Line 52, "other" should read -- another --; and
Line 56, "object" should read -- objects --.

Column 5,
Line 46, "other" should read -- the other --; and
Line 62, "tin" should read -- in --.

Column 6,
Line 4, "characteristic," should read -- characteristics, --; and
Line 62, "hating" should read -- hatching --.

Column 8,
Lines 7 and 13, "other" should read -- another --.

Signed and Sealed this

Twenty-ninth Day of July, 2003

JAMES E. ROGAN
*Director of the United States Patent and Trademark Office*